UNITED STATES PATENT OFFICE.

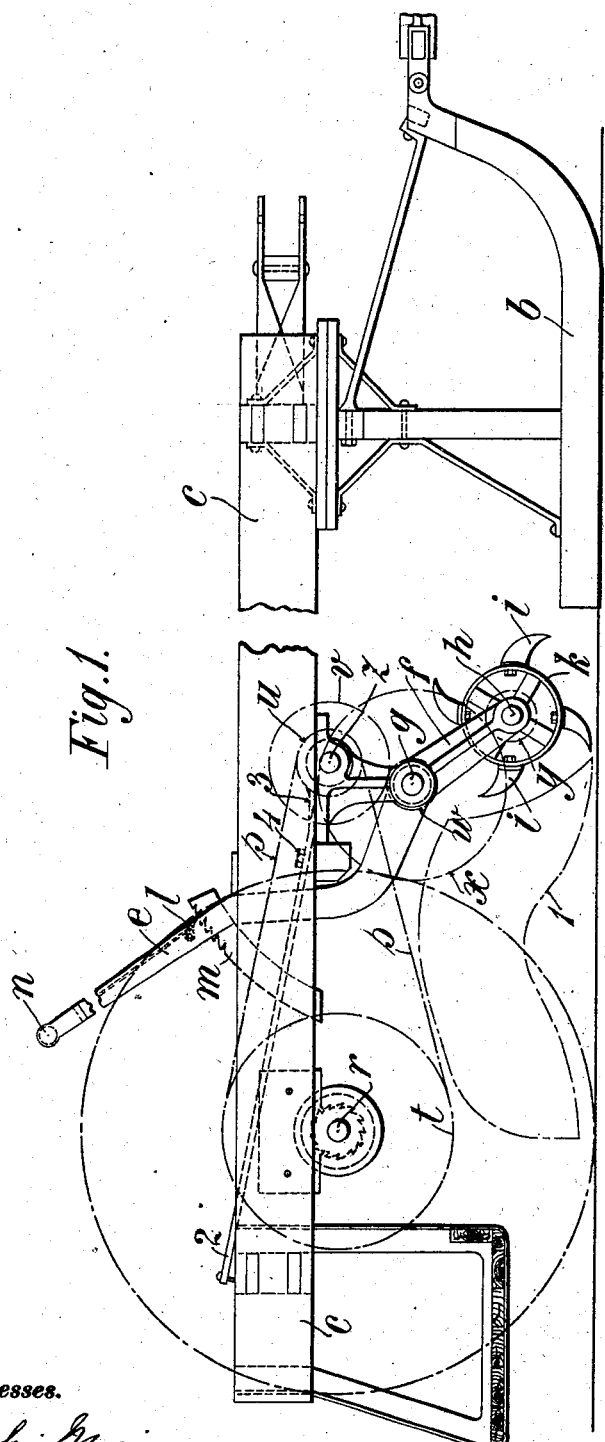

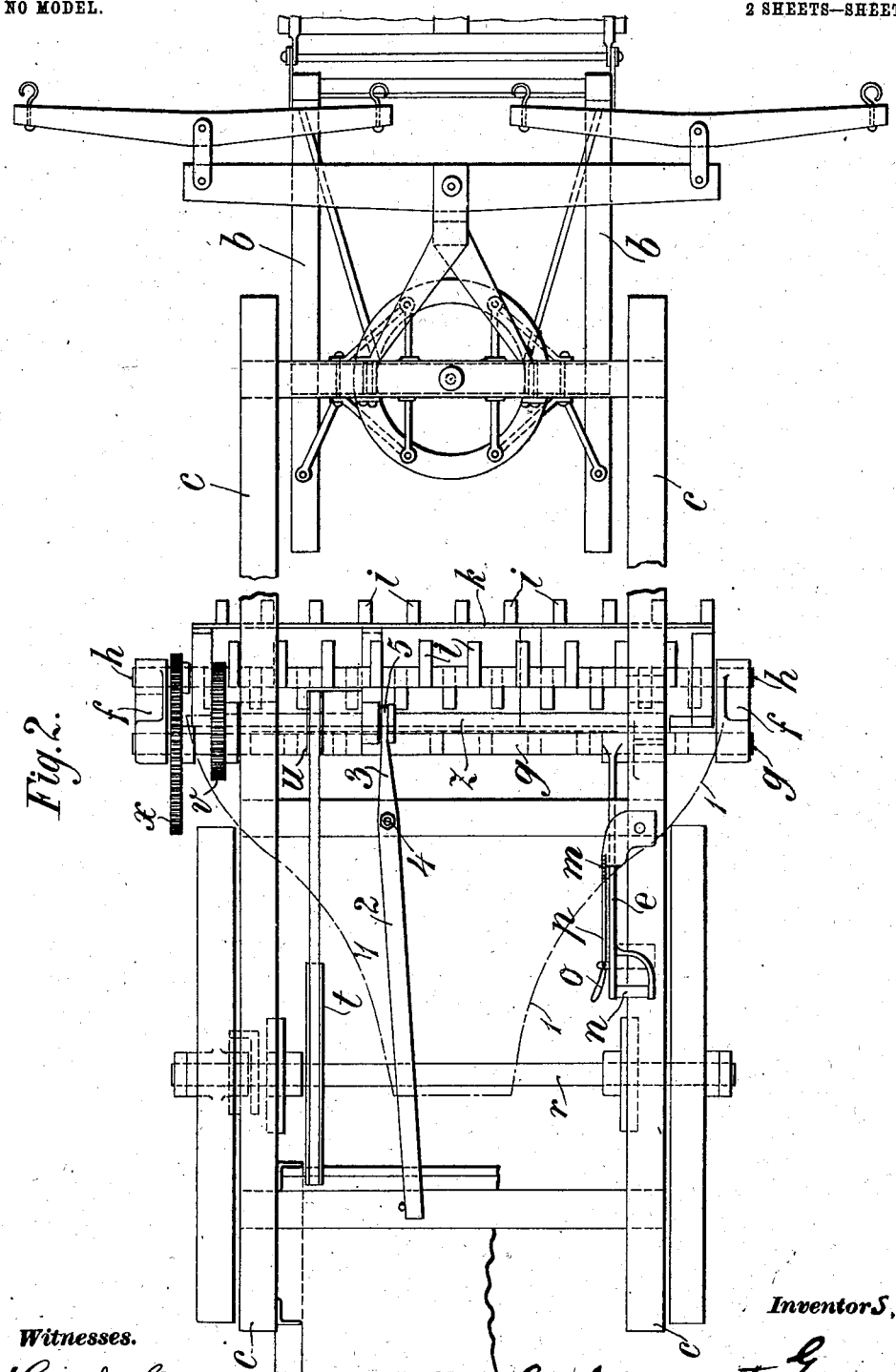

CARL AUGUST GREEN, OF KATRINEHOLM, AND HANS EDUARD LARSSON, OF STOCKHOLM, SWEDEN.

MACHINE FOR CUTTING UP ICE IN STREETS, &c.

SPECIFICATION forming part of Letters Patent No. 721,364, dated February 24, 1903.

Application filed July 31, 1902. Serial No. 117,799. (No model.)

*To all whom it may concern:*

Be it known that we, CARL AUGUST GREEN, residing at Katrineholm, and HANS EDUARD LARSSON, inspector, residing at Tulegatan 25, Stockholm, Sweden, both subjects of the King of Sweden and Norway, have invented certain new and useful Improvements in Machines for Cutting Up Ice in Streets and in other Frequented Places; and we declare that the following is a full, clear, and exact description of the invention, which will enable others skilled in the art to which it appertains to make and use the same.

The invention is shown in the annexed drawings, in which—

Figure 1 is an elevation of a machine constructed according to this invention, and Fig. 2 is a top plan view of the same.

A frame $c$, provided with rear wheels—in the present instance traction-wheels—or a cart with a fore sled $b$, carries a forked lever comprising the hand-controlled arm $e$, the rock-shaft $g$, to which it is keyed, and the two arms $f$, one at each end of said rock-shaft and rigid therewith. The lower arms $f$ of the lever carry on a shaft $h$ a drum $k$, provided with teeth $i$, extending from side to side of the machine and rotated in suitable manner. The teeth are distributed on the circumference of the drum in such manner that a uniform cutting up of the ice takes place as the drum rotates. The drum $k$, and in consequence thereof the teeth, may be adjusted at a greater or less distance from the ground by means of a spring-pressed dog $l$, pivoted to the lever-arm $e$ and engaging with the teeth of a toothed bar or toothed sector $m$, arranged on the frame. The lever $e\ f$ is acted upon by means of the handle $n$, the adjustment of the pawl $l$ in the respective positions being facilitated by thumb-lever $o$ and link $p$. (See Fig. 2.) The drum $k$ may be caused to rotate by means of any suitable arrangement—for instance, the gear-trains shown on the drawings, in which the motion of the wheel-shaft $r$ is transmitted to the drum by means of the chain belt $s$, the chain-wheels $t\ u$, mounted, respectively, on wheel-shaft $r$, and counter-shaft $z$, and the spur-wheels $v\ w\ x\ y$. The chain-wheel $u$ runs loose upon shaft $z$, but may be made fast therewith by means of lever 2 with forked arm 3, working on vertical pivot-pin 4 and yoking into the grooved hub of sliding clutch 5. The spur-wheel $v$ is fixed to said shaft $z$, so as to be revolved whenever the chain-wheel is locked thereto. The spur-wheels $v$ and $x$ are fixed to each other, but revolve loosely on shaft $g$, and spur-wheel $y$ is fast to the shaft $h$ of the drum.

A gatherer or collector 1, of a suitable shape—for instance, in the shape of a chute—tapering rearward, may, if desired, be secured to the frame $c$ in such a manner that its fore part suited to the width to be cut up collects the ice pieces cut up and delivers them as a narrow ridge at the narrow rear part of the chute, so that it will be easier to shovel them up. The bottom of the chute-formed plate 1 rises rearward and then again descends rearward, so that the ice pieces thrown beyond the highest point of the said bottom by the teeth of the roll will slide down on the street, &c., at the outlet or rear part of the chute.

Having thus described our invention, what we claim, and desire to secure by Letters Patent, is—

1. In a machine of the character described, the combination of a carrying-frame, running supports therefor, a series of movable cutting-teeth extending from side to side of the machine, means for actuating said teeth, and a gatherer extending coördinately with and immediately behind the teeth and narrowing to the rear to deposit the ice in a narrow ridge.

2. In a machine of the character described, the combination of a carrying-frame, running supports therefor, a series of movable cutting-teeth, extending from side to side of the machine, means for actuating said teeth, and a gatherer extending coördinately with and immediately behind said teeth, rising convergingly to the rear and finally descending to discharge the broken ice in a compact ridge.

3. In a machine of the character described, the combination of a carrying-frame, running supports therefor, a drum extending from side to side of the machine, cutting-teeth carried by said drum, means for revolving the drum, and a gatherer extending coördinately with and immediately behind said drum and converging to the rear.

4. In a machine of the character described, the combination of a carrying-frame, a rock-shaft mounted in said frame, a hand-lever secured to said rock-shaft, arms rigid with and projecting downward from each end of said shaft, a drum mounted in said arms, cutting-teeth in said drum, means for locking the hand-lever in any desired position, and means for rotating said drum.

5. In a machine of the character described, the combination of a carrying-frame, a rock-shaft mounted on said frame, a hand-lever secured to said rock-shaft, arms rigid with and projecting downward from each end of said shaft, a drum mounted in said arms, cutting-teeth on said drum, means for locking the hand-lever in any desired position, a transmission-wheel on the rock-shaft, and a wheel on the drum-shaft driven thereby.

6. In a machine of the character described, the combination of a carrying-frame, traction-wheels supporting the rear thereof, a slide supporting the front thereof, a rock-shaft journaled in the frame, a hand-lever fixed thereto, arms rigid with and projecting downward from each end of said shaft, a drum mounted in said arms, cutting-teeth on said drum, means for locking the hand-lever in any desired position, a chain-wheel on the shaft of the traction-wheels, a chain-wheel on a counter-shaft, a connecting-belt, and a gear-train connecting with a spur-gear on the shaft of the drum.

In testimony whereof we affix our signatures in presence of two witnesses.

CARL AUGUST GREEN.
HANS EDUARD LARSSON.

Witnesses:
EMS. L. VARDLINDK,
CHAR. FREDBORG.